US010382363B2

(12) United States Patent
Huang

(10) Patent No.: US 10,382,363 B2
(45) Date of Patent: Aug. 13, 2019

(54) CHASSIS SWITCHES, NETWORK INTERFACE CARDS, AND METHODS FOR MANAGEMENT OF PACKET FORWARDING

(71) Applicant: Accton Technology Corporation, Hsinchu (TW)

(72) Inventor: Chin-Chieh Huang, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 15/991,456

(22) Filed: May 29, 2018

(65) Prior Publication Data
US 2019/0149484 A1  May 16, 2019

(30) Foreign Application Priority Data

Nov. 10, 2017  (CN) .......................... 2017 1 1104527

(51) Int. Cl.
*H04L 12/931* (2013.01)
*H04L 29/06* (2006.01)
*H04L 12/947* (2013.01)
*H04L 12/721* (2013.01)

(52) U.S. Cl.
CPC ............ *H04L 49/354* (2013.01); *H04L 45/38* (2013.01); *H04L 49/25* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 8,031,709 B2 * | 10/2011 | Alexander, Jr. | ...... | H04L 12/4645 370/389 |
| 9,634,927 B1 * | 4/2017 | Singh | ...................... | H04L 12/46 370/389 |
| 2007/0121580 A1 * | 5/2007 | Forte | ................. | H04L 29/06027 370/351 |
| 2007/0297393 A1 * | 12/2007 | Furukawa | ............... | H04L 12/66 370/352 |
| 2012/0113989 A1 * | 5/2012 | Akiyoshi | ................ | H04L 45/02 370/392 |
| 2013/0044636 A1 * | 2/2013 | Koponen | ................ | H04L 47/12 370/254 |
| 2013/0239181 A1 * | 9/2013 | Varsavsky Waisman-Diamond | .......... | H04L 29/12367 726/4 |
| 2014/0286337 A1 * | 9/2014 | Dolson | ................... | H04L 43/12 370/392 |
| 2014/0341030 A1 * | 11/2014 | Kuo | ...................... | H04L 47/122 370/235 |
| 2016/0315881 A1 * | 10/2016 | Pierson | ................... | H04L 49/35 370/389 |

(Continued)

*Primary Examiner* — Anh Vu H Ly
(74) *Attorney, Agent, or Firm* — Birch, Stewart, Kolasch & Birch, LLP

(57) ABSTRACT

A chassis switch including a network interface card is provided. The network interface card includes a first Virtual Local Area Network (VLAN) ID to a first packet originating from an internal Internet Protocol (IP) address, to prevent the first packet from being forwarded to the outside of the chassis switch. In addition, the network interface card further includes a second VLAN ID to a second packet originating from an external IP address, to allow the second packet to be forwarded to the outside of the chassis switch.

11 Claims, 11 Drawing Sheets

(56) References Cited

U.S. PATENT DOCUMENTS

2019/0158430 A1* 5/2019 Pierson ................ H04L 49/35
370/389

* cited by examiner

CHASSIS SWITCHES, NETWORK INTERFACE CARDS, AND METHODS FOR MANAGEMENT OF PACKET FORWARDING

CROSS REFERENCE TO RELATED APPLICATIONS

This Application claims priority of China Patent Application No. 201711104527.9, filed on Nov. 10, 2017, the entirety of which is incorporated by reference herein.

BACKGROUND OF THE APPLICATION

Field of the Application

The application generally relates to management of packet forwarding, and more particularly, to management of packet forwarding for chassis switches.

Description of the Related Art

With the rapid development of network communication technologies, demand for greater network bandwidth has been rising, along with fast-changing network requirements. In response, network deployment configurations need to be dynamically and easily adjustable.

Chassis switches are commonly used in network deployments due to the fact that various communication components, such as one or more network interface cards of different types, may be installed therein to satisfy different network requirements. A chassis switch usually includes multiple network interface cards, and thus, management of these cards within a chassis switch is required. In addition to the card management within a chassis switch, there may be situations where multiple chassis switches are deployed in a network environment and management of these cards across different chassis switches is also required.

In general, each network interface card within a chassis switch is assigned with at least an internal Internet Protocol (IP) address and an external IP address. The external IP address is assigned by the Dynamic Host Configuration Protocol (DHCP) server, and may be used to uniquely identify the network interface card in a network environment including two chassis switches. The external IP address is used for managing the network interface cards in another chassis switch. By contrast, the internal IP address is determined according to the placement of the slot in which it is inserted within a chassis switch. Specifically, each slot within a chassis switch is corresponding to a respective internal IP address, and each network interface card is assigned with the internal IP address corresponding to the slot in which it is inserted. The internal IP address is used for managing the network interface cards within a chassis switch.

That is, the slots with the same placement in all chassis switches will be assigned with the same internal IP address. As a result, in a network environment including multiple chassis switches, IP conflicts may occur if internal IP addresses are used for packet forwarding between different chassis switches.

FIG. 1 is a schematic diagram illustrating an IP conflict occurred when internal IP addresses are used for packet forwarding between different chassis switches. It is assumed that both the chassis switches have the same rules for assigning internal IP addresses to the network interface cards according to the placements of the slots within the chassis switches, and thus, the network interface cards inserted in the slots with the same placement in these two chassis switches will be assigned with the same internal IP address. As shown in FIG. 1, the network interface card 1 in the chassis switch A uses its internal IP address (denoted as "169.254.251.1") to forward a packet X, and when receiving the packet X, the router keeps the source IP address and the ingress port (denoted as port 1) of the packet X in the forwarding table. Next, the network interface card 1 in the chassis switch B uses the same internal IP address (denoted as "169.254.251.1") to forward a packet Y, and when receiving the packet Y, the router keeps the source IP address and the ingress port (denoted as port 2) of the packet Y in the forwarding table.

Since the forwarding table is usually maintained using the field of the source IP addresses as the primary key, the information of the packet X will be overwritten by the information of the packet Y, which links the internal IP address "169.254.251.1" to port 2. Consequently, any packets which are meant to be sent to the network interface card 1 in the chassis switch A will be mistakenly forwarded by the router to the network interface card 1 in the chassis switch B.

Therefore, it is desirable to have a more robust way of managing packet forwarding when internal IP addresses are used.

BRIEF SUMMARY OF THE APPLICATION

In order to solve the aforementioned problem, the present application proposes a way of managing packet forwarding, which establishes Virtual Local Area Networks (VLANs) in the chassis switch to prevent packets originating from internal IP addresses from being forwarded to the outside of the chassis switch, while allowing the forwarding of packets originating from external IP addresses.

In one aspect of the application, a chassis switch comprising a network interface card is provided. The network interface card comprises an external port for communications towards outside of the chassis switch, and is configured to process a first packet originating from an internal Internet Protocol (IP) address, and a second packet originating from an external IP address. The processing of the first packet comprises: including a first Virtual Local Area Network (VLAN) tag in the first packet, determining a first egress port for the first packet according to the first VLAN tag and a first Media Access Control (MAC) address included in the first packet, and dropping the first packet when the first egress port is the external port. The processing of the second packet comprises: including a second VLAN tag in the second packet, determining a second egress port for the second packet according to the second VLAN tag and a second MAC address included in the second packet, and removing the second VLAN tag from the second packet and forwarding the second packet via the second egress port.

In another aspect of the application, a method for management of packet forwarding, executed by a network interface card of a chassis switch, is provided. The method comprises the steps of: processing a first packet originating from an internal IP address, wherein the processing of the first packet comprises: including a first VLAN tag in the first packet, determining a first egress port for the first packet according to the first VLAN tag and a first MAC address included in the first packet, and dropping the first packet when the first egress port is the external port; and processing a second packet originating from an external IP address, wherein the processing of the second packet comprises: including a second VLAN tag in the second packet, determining a second egress port for the second packet according to the second VLAN tag and a second MAC address included in the second packet, and removing the second VLAN tag from the second packet and forwarding the second packet via the second egress port.

In yet another aspect of the application, a network interface card comprising an external port, a controller, and a switch device is provided. The external port is configured for communications towards outside of the chassis switch. The controller is configured to generate a first packet originating from an internal IP address, and a second packet originating from an external IP address. The switch device is configured to include a first VLAN tag in the first packet, determine a first egress port for the first packet according to the first VLAN tag and a first MAC address included in the first packet, drop the first packet when the first egress port is the external port, include a second VLAN tag in the second packet, determine a second egress port for the second packet according to the second VLAN tag and a second MAC address included in the second packet, and remove the second VLAN tag from the second packet and forward the second packet via the second egress port.

Other aspects and features of the present application will become apparent to those with ordinarily skill in the art upon review of the following descriptions of specific embodiments of the chassis switches, the internet interface cards, and methods for management of packet forwarding.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
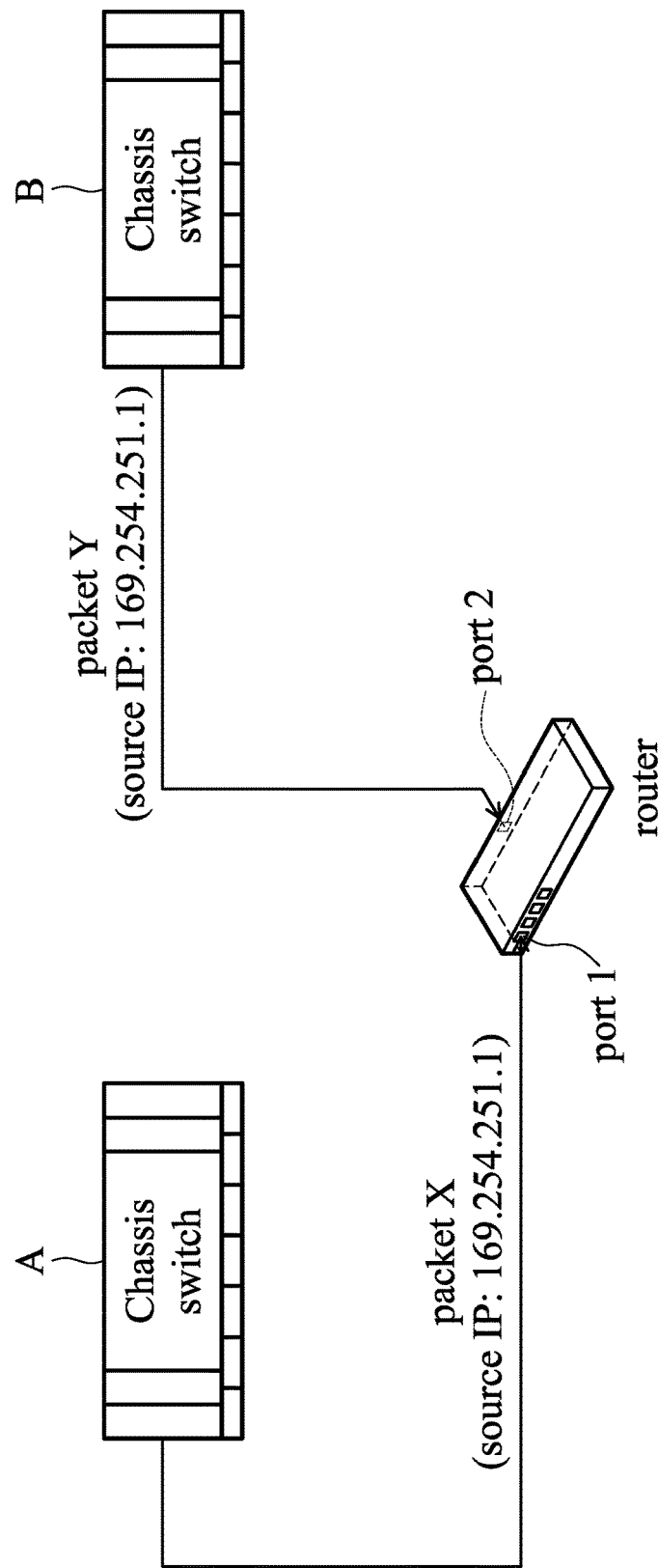
FIG. 1 is a schematic diagram illustrating an IP conflict occurred when internal IP addresses are used for packet forwarding between different chassis switches.
Figure 2:
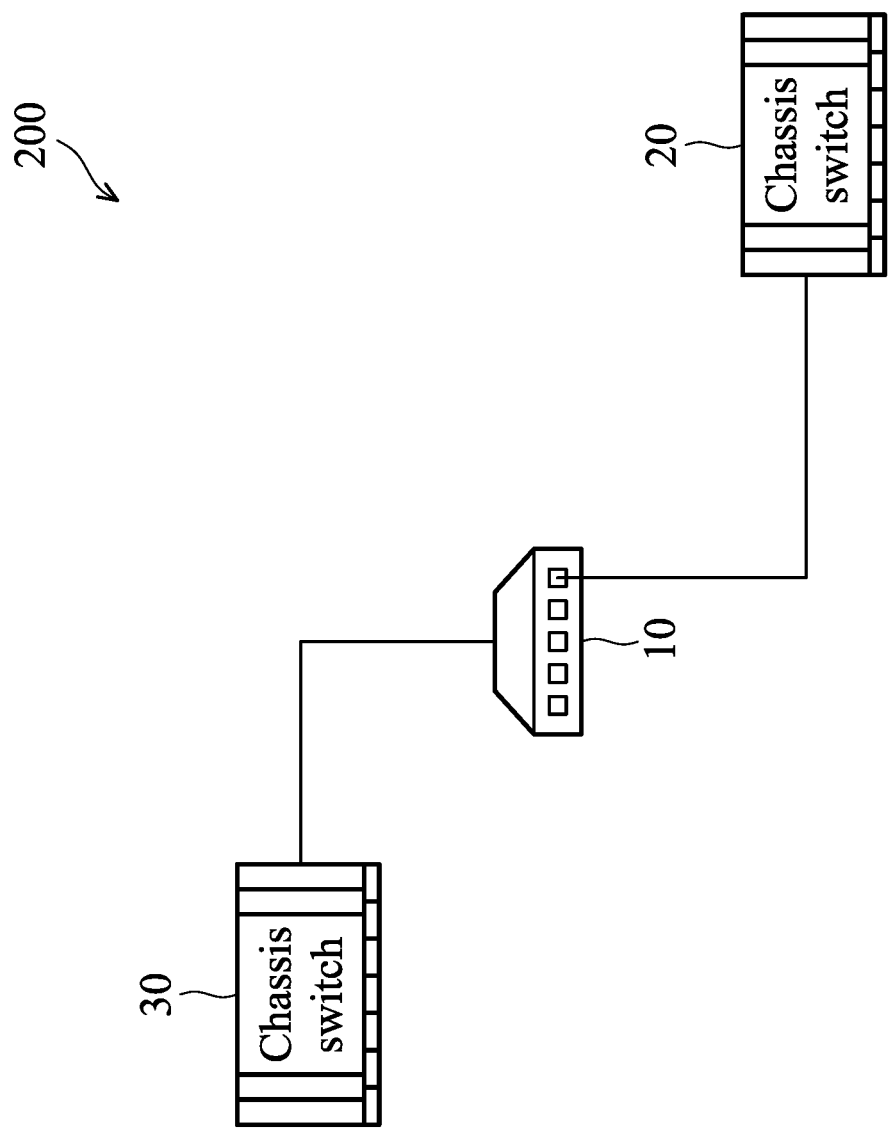
FIG. 2 is a block diagram illustrating an exemplary network environment according to an embodiment of the application.

FIG. 2 is a block diagram illustrating an exemplary network environment according to an embodiment of the application. The network environment 200 is a local network which includes a router 10 and at least two chassis switches 20 and 30, wherein the chassis switches 20 and 30 are connected to each other via the router 10.

The local network may be an Ethernet, a twisted-pair cable network, or a coaxial cable network. The local network may also be referred to as an internal network, which generally covers a small area, such as an office or a floor of a building.

The router 10 is responsible for routing and forwarding packets within the local network to realize packet exchange between the chassis switches 20 and 30 and between the chassis switch 20 or 30 and other network terminal devices in the same local network. Although not shown, the router 10 may also bridge the local network to external networks, to realize packet routing and forwarding towards the outside of the local network.

Each of the chassis switches 20 and 30 may include multiple slots, in each of which a network interface card may be inserted. For example, a network interface card may refer to a fabric card or a line card, and the slots may be divided into fabric-card slots and line-card slots for installations of fabric cards and line cards, respectively. Particularly, the rules for assigning internal IP addresses to the network interface cards are the same in the chassis switches 20 and 30. That is, the network interface cards (e.g., line cards or fabric cards) inserted in the slots with the same placement in the chassis switches 20 and 30 will be assigned with the same internal IP address.

The chassis switches 20 and 30 may provide flexibility of network organization, by changing the configurations of the network interface cards in the chassis switches 20 and 30 to dynamically adjust the organization of the local network for accommodating more or fewer network terminal devices. For example, each network interface card (e.g., each line card) may be coupled to a network terminal device, such as a laptop computer, a desktop computer, a smartphone, a tablet Personal Computer (PC), a workstation, or a server, etc.

Figure 3:
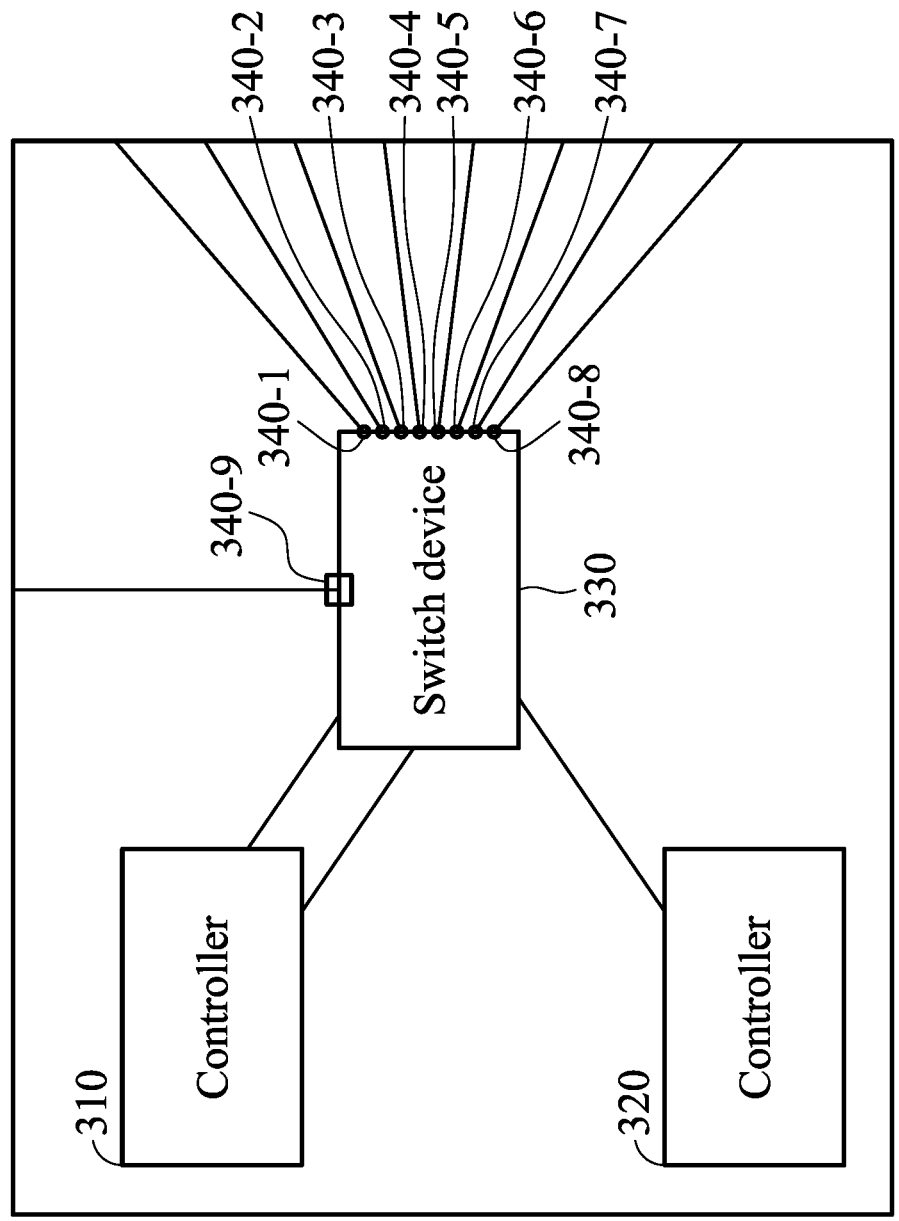
FIG. 3 is a block diagram illustrating a fabric card according to an embodiment of the application.

FIG. 3 is a block diagram illustrating a fabric card according to an embodiment of the application. In this embodiment, each of the chassis switches 20 and 30 includes 4 fabric cards and 8 line cards, wherein the block diagram of each fabric card is depicted in FIG. 3. Specifically, a fabric card includes two controllers 310 and 320, a switch device 330, eight internal ports 340-1 to 340-8, and an external port 340-9.

Each of the controllers 310 and 320 may be a general-purpose processor, a Central Processing Unit (CPU), a Micro Control Unit (MCU), an Application Processor (AP), a Digital Signal Processor (DSP), or the like, which includes various circuits for providing the functions of data processing and computing, and controlling the operation of the switch device 330 for management of packet forwarding.

Each of the controllers 310 and 320 is assigned with an internal IP address and an external IP address.

The switch device 330 provides the function of packet forwarding according to the control signals received from the controller 310 or 320. In one embodiment, the switch device 330 may be a (Gibabit) Ethernet switch, such as a Broadcom BCM5396 chip, in compliance with the IEEE 802.3, IEEE 802.3u, IEEE 802.3ab, or IEEE 802.3x standard.

In one embodiment, the switch device 330 may include a storage device, such as a Random Access Memory (RAM), flash memory, cache memory, or another type of memory, or another storage medium, which stores computer-readable instructions or program code, and stores data, such as a forwarding table recording packet parameters, and a VLAN table recording VLAN configuration parameters, etc.

Each of the internal ports 340-1 to 340-8 is coupled to a respective one of the 8 line cards in the chassis switch 20 or 30, for receiving and transmitting/forwarding packets from and to the coupled line card.

The external port 340-9 is coupled to the external port of the chassis switch 20 or 30 for communications towards the outside of the chassis switch 20 or 30, to serve as the access point for managing the chassis switch 20 or 30 from the outside, and to transmit/forward packets to the outside of the chassis switch 20 or 30, such as a chassis switch or network terminal device other than the chassis switch 20 or 30.

Please note that the controller 310 or 320 may execute the configuration file in the switch device 330 to establish a first VLAN for processing packets originating from internal IP addresses and a second VLAN for processing packets originating from external IP addresses, and to configure the member ports of the first and second VLANs. In one embodiment, all ports except for the port 340-9 (i.e., the ports 340-1 to 340-8) are configured as the member ports of the first VLAN, while all ports (i.e., the ports 340-1 to 340-9) are configured as the member ports of the second VLAN.

Figure 4:
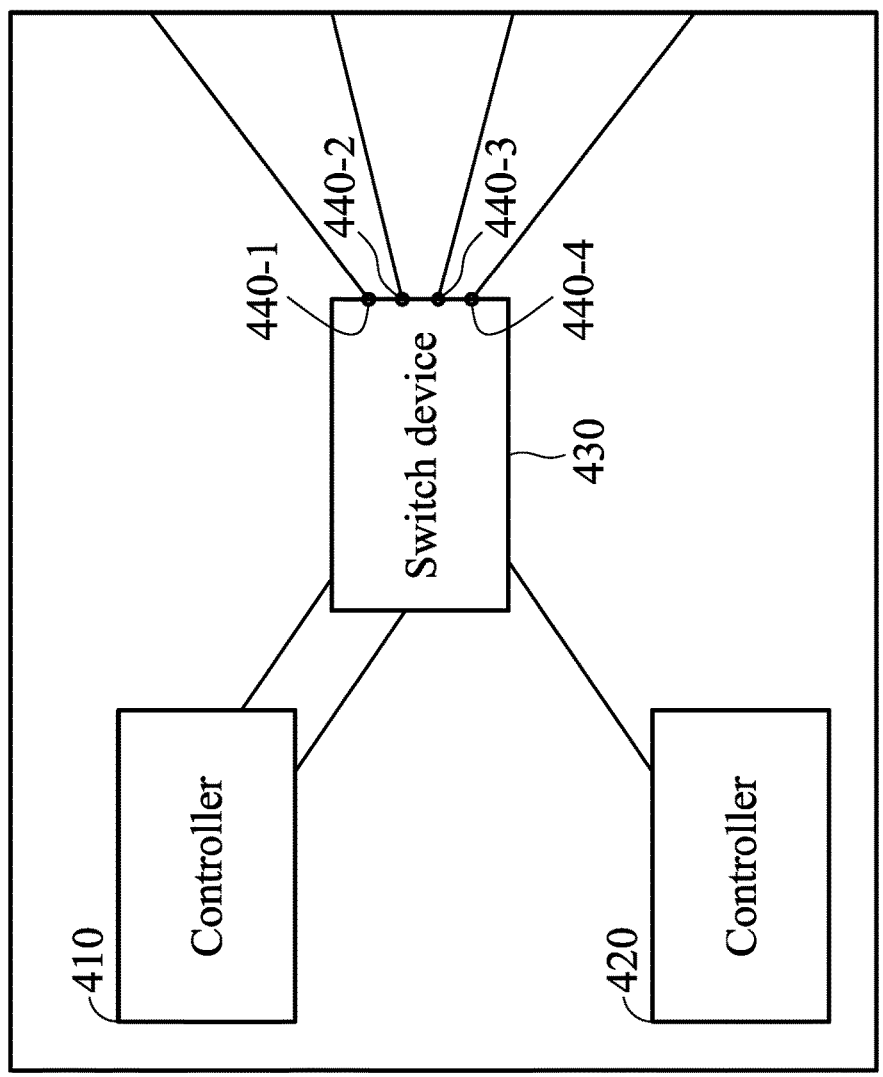
FIG. 4 is a block diagram illustrating a line card according to an embodiment of the application.

FIG. 4 is a block diagram illustrating a line card according to an embodiment of the application. In this embodiment, each of the chassis switches 20 and 30 includes 4 fabric cards and 8 line cards, wherein the block diagram of each line card is depicted in FIG. 4. Specifically, a line card includes two controllers 410 and 420, a switch device 430, and four internal ports 440-1 to 440-4.

Each of the controllers 410 and 420 may be a general-purpose processor, a CPU, an MCU, an AP, a DSP, or the like, which includes various circuits for providing the functions of data processing and computing, and controlling the operation of the switch device 430 for management of packet forwarding. Each of the controllers 410 and 420 is assigned with an internal IP address and an external IP address.

The switch device 430 provides the function of packet forwarding according to the control signals received from the controller 410 or 420. In one embodiment, the switch device 330 may be a (Gibabit) Ethernet switch, such as a Broadcom BCM5389 chip, in compliance with the IEEE 802.3, IEEE 802.3u, IEEE 802.3ab, or IEEE 802.3x standard.

In one embodiment, the switch device 430 may include a storage device, such as a Random Access Memory (RAM), flash memory, cache memory, or another type of memory, or another storage medium, which stores data and computer-readable instructions or program code.

Each of the internal ports 440-1 to 440-4 is coupled to a respective one of the 4 fabric cards in the chassis switch 20 or 30, for receiving and transmitting/forwarding packets from and to the coupled fabric card.

Please note that the controller 410 or 420 may execute the configuration file in the switch device 430 to establish a first VLAN for processing packets originating from internal IP addresses and a second VLAN for processing packets originating from external IP addresses, and to configure the member ports of the first and second VLANs. It should be understood that although the line card depicted in FIG. 4 does not include an external port, the present application should not be limited thereto. That is, in another embodiment, a line card may include an external port, and all ports except for the external port may be configured as the member ports of the first VLAN, while all ports may be configured as the member ports of the second VLAN.

As will be appreciated by persons skilled in the art, the circuits in the controller 310, 320, 410, or 420 will typically comprise transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

It should be understood that the components described in the embodiment of FIGS. 3 and 4 are for illustrative purposes only and are not intended to limit the scope of the application. For example, a fabric card or line card may include only a single controller or more than two controllers. Alternatively, the chassis switch 20 or 30 may include more or fewer than 4 fabric cards, or more or fewer than 8 line cards, and the number of internal ports in a fabric card or line card may be adjusted accordingly.

Figure 5:
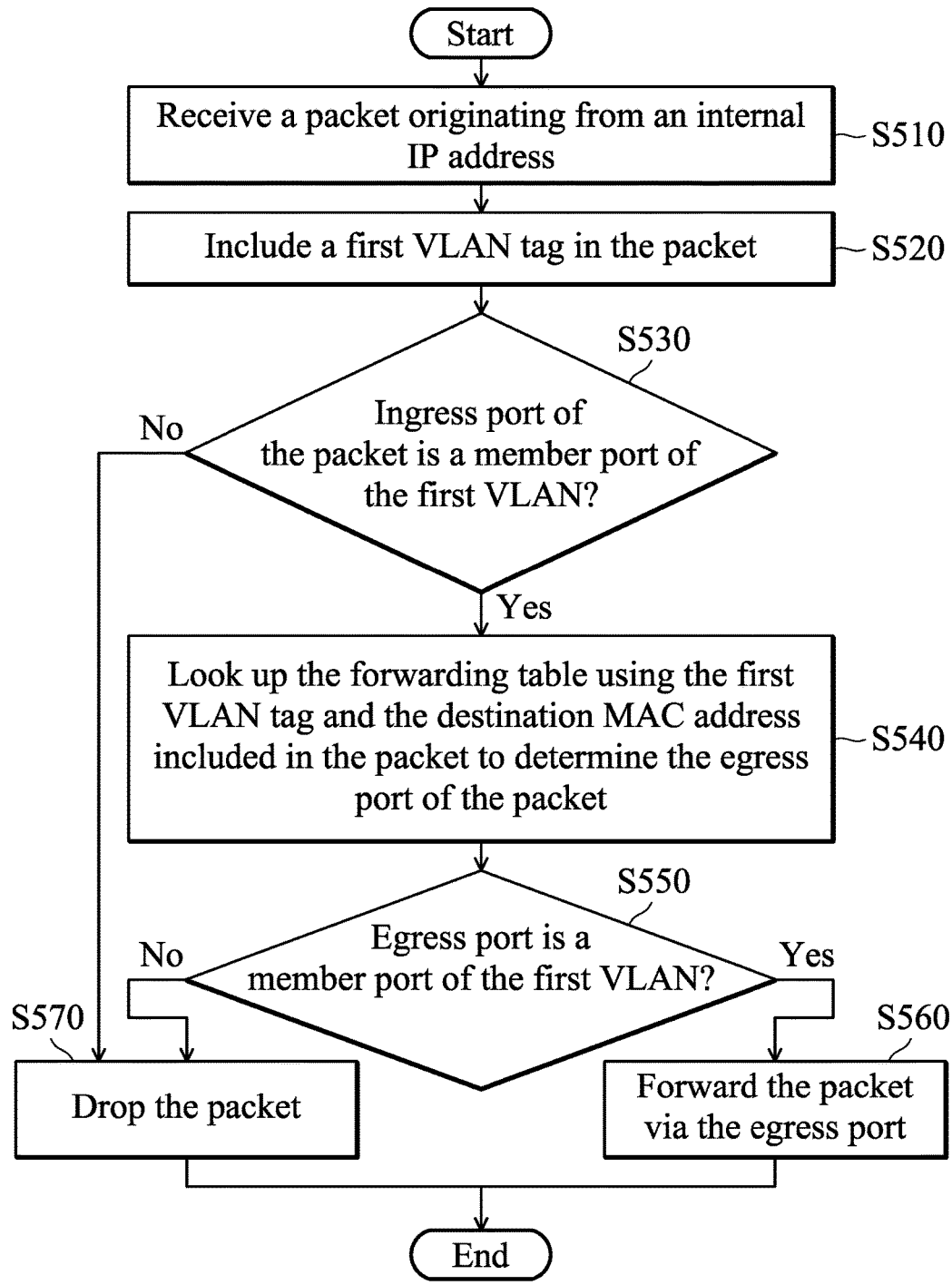
FIG. 5 is a flow chart illustrating the method for management of packet forwarding for packets originating from internal IP addresses according to an embodiment of the application.

FIG. 5 is a flow chart illustrating the method for management of packet forwarding for packets originating from internal IP addresses according to an embodiment of the application. In this embodiment, the method for management of packet forwarding may be applied to a network interface card (e.g., a fabric card or a line card) in a chassis switch.

To begin with, the network interface card receives a packet originating from an internal IP address (step S510). Specifically, the header of the packet includes multiple packet parameters, including the source IP address, the destination IP address, the source Media Access Control (MAC) address, and the destination MAC address, etc. The source IP address indicates the IP address of the originator of the packet. If the source IP address is an internal IP address, it may be determined that the packet originated from an internal IP address.

Next, the network interface card includes a first VLAN tag in the packet (i.e., tags the packet with a first VLAN tag) (step S520). Specifically, the first VLAN tag indicates the VLAN ID of the first VLAN. For example, the VLAN ID of the first VLAN may be configured to be 4088.

After that, the network interface card determines whether the ingress port of the packet is one of the member ports of the first VLAN (step S530), and if so, looks up the forwarding table using the first VLAN tag and the destination MAC address included in the packet to determine the egress port of the packet (step S540).

Subsequent to step S540, the network interface card determines whether the egress port is one of the member ports of the first VLAN (step S550), and if so, forwards the packet via the egress port (step S560), and the method ends.

Subsequent to step S550, if the egress port is not one of the member ports of the first VLAN, the network interface card drops the packet (i.e., does not forward the packet) (step S570), and the method ends.

Subsequent to step S530, if the ingress port is not one of the member ports of the first VLAN, the method flow proceeds to step S570.

Figure 6:
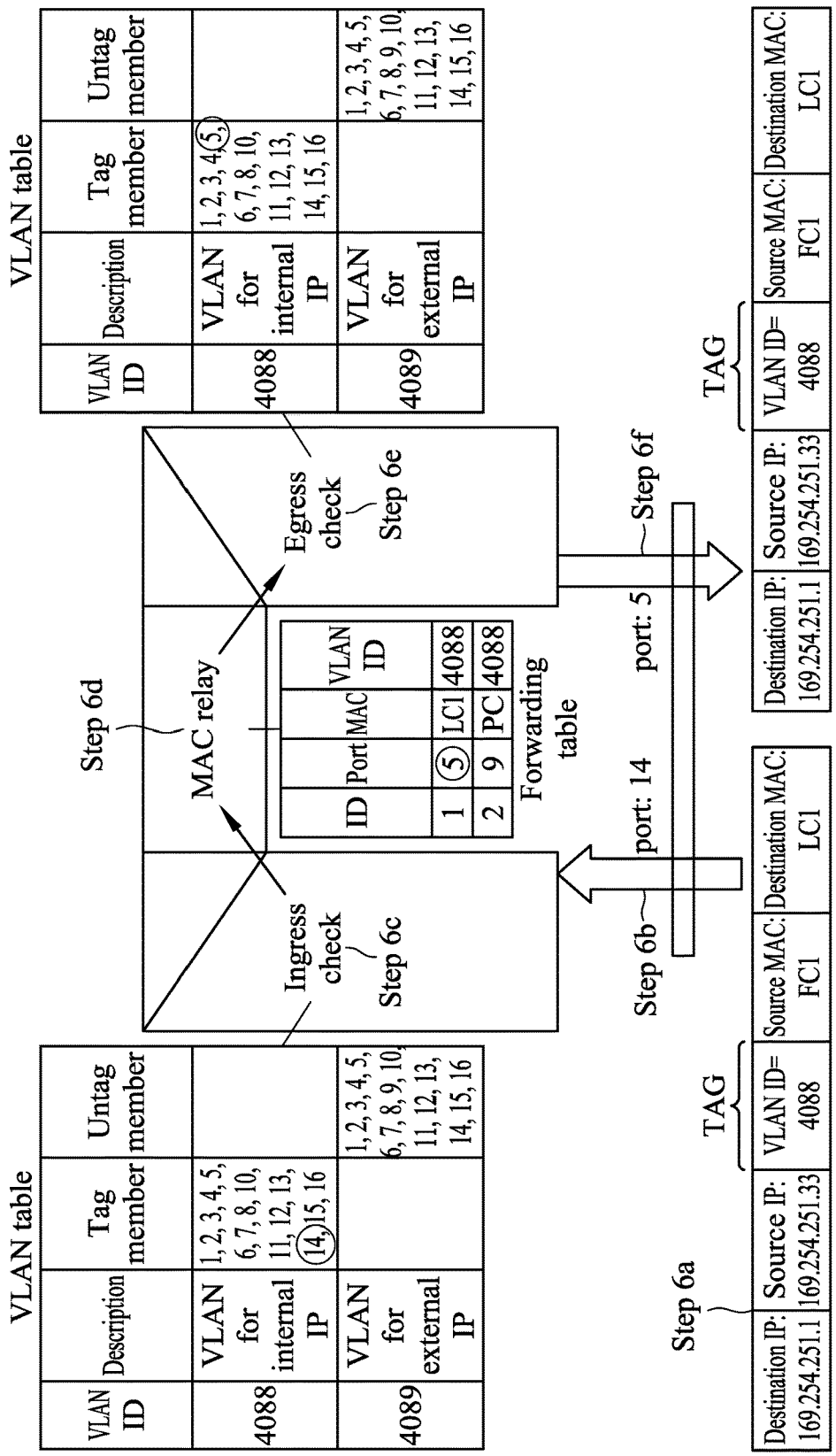
FIG. 6 is a schematic diagram illustrating the management of packet forwarding for packets originating from internal IP addresses according to an embodiment of the application.

FIG. 6 is a schematic diagram illustrating the management of packet forwarding for packets originating from internal IP addresses according to an embodiment of the application. In this embodiment, it begins with a fabric card generating a packet using an internal IP address when the fabric card pings a line card within the same chassis switch. Specifically, the source IP address of the packet is the internal IP address assigned to a controller (e.g., the controller 310) of the fabric card, and the destination IP address of the packet is the internal IP address assigned to a controller (e.g., the controller 410) of the line card.

In step 6a, the controller 310 of a fabric card determines to ping the controller 410 of a line card, and accordingly, it generates a layer-3 (i.e., the network layer of the Open System Interconnection (OSI) reference model) packet (i.e., the packet originated from an internal IP address as described in FIG. 5), and includes a VLAN tag in the packet (i.e., tags the packet with a VLAN tag).

Specifically, the header of the packet includes the destination IP address, the source IP address, the VLAN tag, the source MAC address, and the destination MAC address of the packet. As shown in FIG. 6, the destination IP address is "169.254.251.1", the source IP address is "169.254.251.33", the VLAN tag is the VLAN ID=4088, the source MAC address is denoted as "FC1", and the destination MAC address is denoted as "LC1".

In step 6b, the controller 310 of the fabric card sends the packet to port 14 of the switch device 330. That is, port 14 is the ingress port of the packet.

In step 6c, the switch device 330 performs an ingress check on the packet. Specifically, the ingress check is to look up the VLAN table using the VLAN tag (i.e., VLAN ID=4088) and the ingress port number (i.e., port 14), and determines whether the ingress port is a valid port (member port) of the VLAN with VLAN ID=4088. In this embodiment, all ports except for the external port (i.e., port 9) are configured as valid ports of the VLAN with VLAN ID=4088 in the VLAN table. That is, since the ingress port (i.e., port 14) is not the external port, it is determined to be a valid port of the VLAN with VLAN ID=4088 and passes the ingress check.

In step 6d, the packet goes through a process of MAC relay in the switch device 330. Specifically, the MAC relay includes the switch device 330 looking up the forwarding table using the destination MAC address (i.e., LC1) and the VLAN tag (i.e., VLAN ID=4088) of the packet to determine the egress port of the packet. In this embodiment, the egress port is port 5.

In step 6e, the switch device 330 performs an egress check on the packet. Specifically, the egress check is to look up the VLAN table using the VLAN tag (i.e., VLAN ID=4088) and the egress port number (i.e., port 5), and determines whether the egress port is a valid port (member port) of the VLAN with VLAN ID=4088. In this embodiment, since the egress port (i.e., port 5) is not the external port, it is determined to be a valid port of the VLAN with VLAN ID=4088 and passes the egress check.

Finally, in step 6f, the switch device 330 forwards the packet via port 5.

Figure 7:
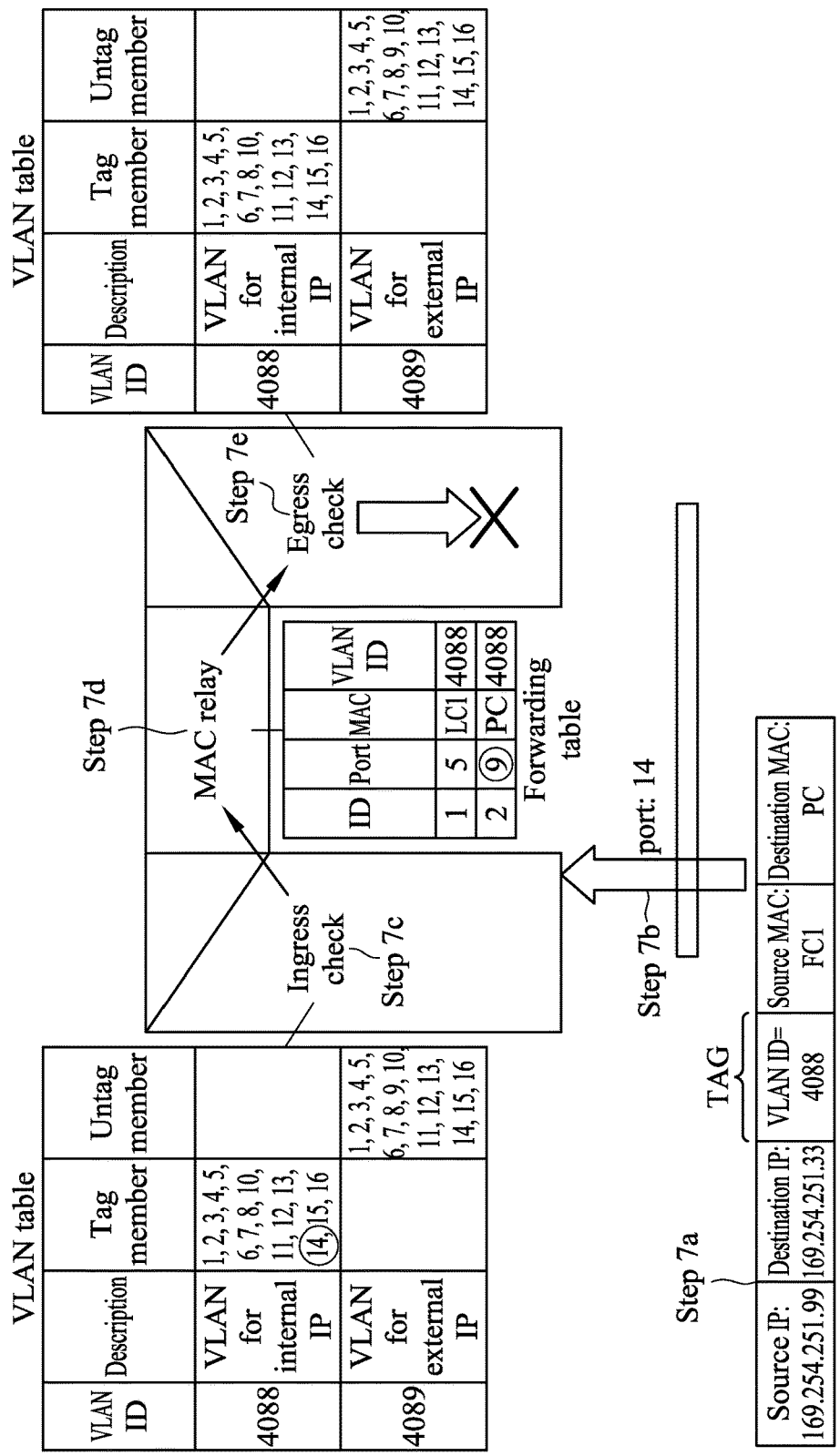
FIG. 7 is a schematic diagram illustrating the management of packet forwarding for packets originating from internal IP addresses according to another embodiment of the application.

FIG. 7 is a schematic diagram illustrating the management of packet forwarding for packets originating from internal IP addresses according to another embodiment of the application.

In step 7a, the controller 310 of a fabric card determines to use its internal IP address to ping a network terminal device other than the chassis switches 20 and 30, and accordingly, it generates a layer-3 (i.e., the network layer of the OSI reference model) packet (i.e., the packet originated from an internal IP address as described in FIG. 5), and includes a VLAN tag in the packet (i.e., tags the packet with a VLAN tag).

Specifically, the header of the packet includes the destination IP address, the source IP address, the VLAN tag, the source MAC address, and the destination MAC address of the packet. As shown in FIG. 7, the destination IP address is "169.254.251.99", the source IP address is "169.254.251.33", the VLAN tag is the VLAN ID=4088, the source MAC address is denoted as "FC1", and the destination MAC address is denoted as "PC".

In step 7b, the controller 310 of the fabric card sends the packet to port 14 of the switch device 330. That is, port 14 is the ingress port of the packet.

In step 7c, the switch device 330 performs an ingress check on the packet. Specifically, the ingress check is to look up the VLAN table using the VLAN tag (i.e., VLAN ID=4088) and the ingress port number (i.e., port 14), and determines whether the ingress port is a valid port (member port) of the VLAN with VLAN ID=4088. In this embodiment, all ports except for the external port (i.e., port 9) are configured as valid ports of the VLAN with VLAN ID=4088 in the VLAN table. That is, since the ingress port (i.e., port 14) is not the external port, it is determined to be a valid port of the VLAN with VLAN ID=4088 and passes the ingress check.

In step 7d, the packet goes through a process of MAC relay in the switch device 330. Specifically, the MAC relay includes the switch device 330 looking up the forwarding table using the destination MAC address (i.e., PC) and the VLAN tag (i.e., VLAN ID=4088) of the packet to determine the egress port of the packet. In this embodiment, the egress port is port 9.

In step 7e, the switch device 330 performs an egress check on the packet. Specifically, the egress check is to look up the VLAN table using the VLAN tag (i.e., VLAN ID=4088) and the egress port number (i.e., port 9), and determines whether the egress port is a valid port (member port) of the VLAN with VLAN ID=4088. In this embodiment, since the egress port (i.e., port 9) is the external port, it is determined to be an invalid port (not a member port) of the VLAN with VLAN ID=4088 and is dropped.

Please note that the VLAN described in the embodiments of FIGS. 5 to 7 is established specifically for processing packets originating from internal IP addresses. Specifically, the VLAN is established for the purpose of preventing packets originating from internal IP addresses from being forwarded to the outside of the chassis switch to cause IP conflicts. However, the VLAN also prevents packets originating from external IP addresses from being forwarded.

Thus, the present application further proposes to establish another VLAN for processing packets originating from external IP addresses.

Figure 8A:
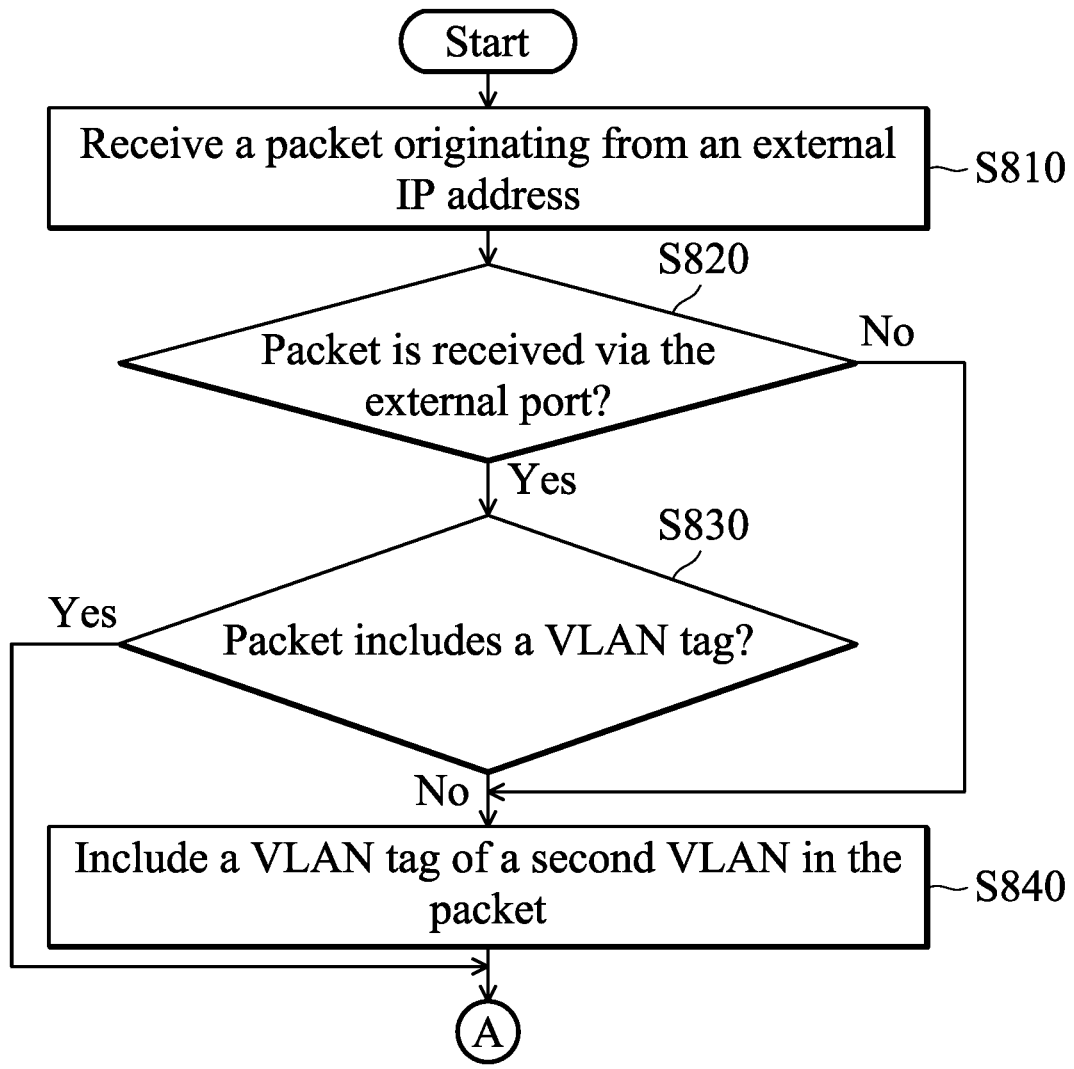
FIGS. 8A and 8B show a flow chart illustrating the method for management of packet forwarding for packets originating from external IP addresses according to an embodiment of the application.
Figure 8B:
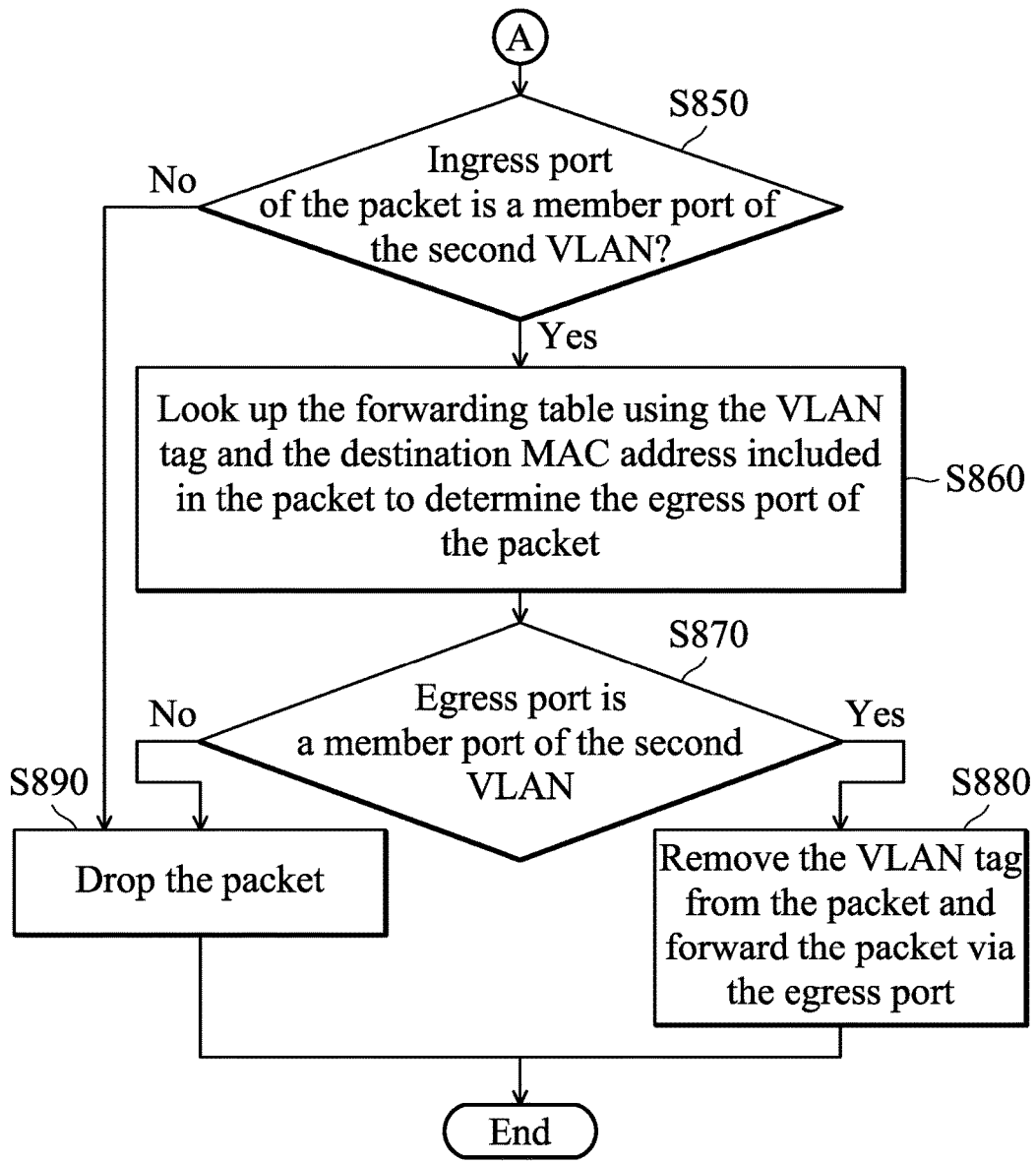

FIGS. 8A and 8B show a flow chart illustrating the method for management of packet forwarding for packets originating from external IP addresses according to an embodiment of the application. In this embodiment, the method for management of packet forwarding may be applied to a network interface card (e.g., a fabric card or a line card) in a chassis switch.

To begin with, the network interface card receives a packet originating from an external IP address (step S810). Specifically, the header of the packet includes multiple packet parameters, including the source IP address, the destination IP address, the source MAC address, and the destination MAC address, etc. The source IP address indicates the IP address of the originator of the packet. If the source IP address is an external IP address, it may be determined that the packet originated from an external IP address.

Next, the network interface card determines whether the packet is received via the external port (step S820), and if so, determines whether the packet includes a VLAN tag (i.e., whether the packet is tagged with a VLAN tag) (step S830). If the packet does not include a VLAN tag, the network interface card includes a VLAN tag of a second VLAN in the packet (i.e., tags the packet with a second VLAN tag) (step S840). Specifically, the VLAN tag indicates the VLAN ID of the second VLAN. For example, the VLAN ID of the second VLAN may be configured to be 4089.

Subsequent to step S820, if the packet is not received via the external port, the method proceeds to step S840.

Subsequent to step S830, if the packet includes a VLAN tag, the method proceeds to step S850.

After that, the network interface card determines whether the ingress port of the packet is one of the member ports of the second VLAN (step S850), and if so, looks up the forwarding table using the VLAN tag and the destination MAC address included in the packet to determine the egress port of the packet (step S860).

Subsequently, the network interface card determines whether the egress port is one of the member ports of the second VLAN (step S870), and if so, removes the VLAN tag from the packet (which may be referred to as un-tagging the packet) and forwards the packet via the egress port (step S880), and the method ends.

Subsequent to step S850, if the ingress port is not a member port of the second VLAN, the network interface card drops the packet (i.e., does not forward the packet) (step S890), and the method ends.

Subsequent to step S870, if the egress port is not a member port of the second VLAN, the method proceeds to step S890.

Figure 9:
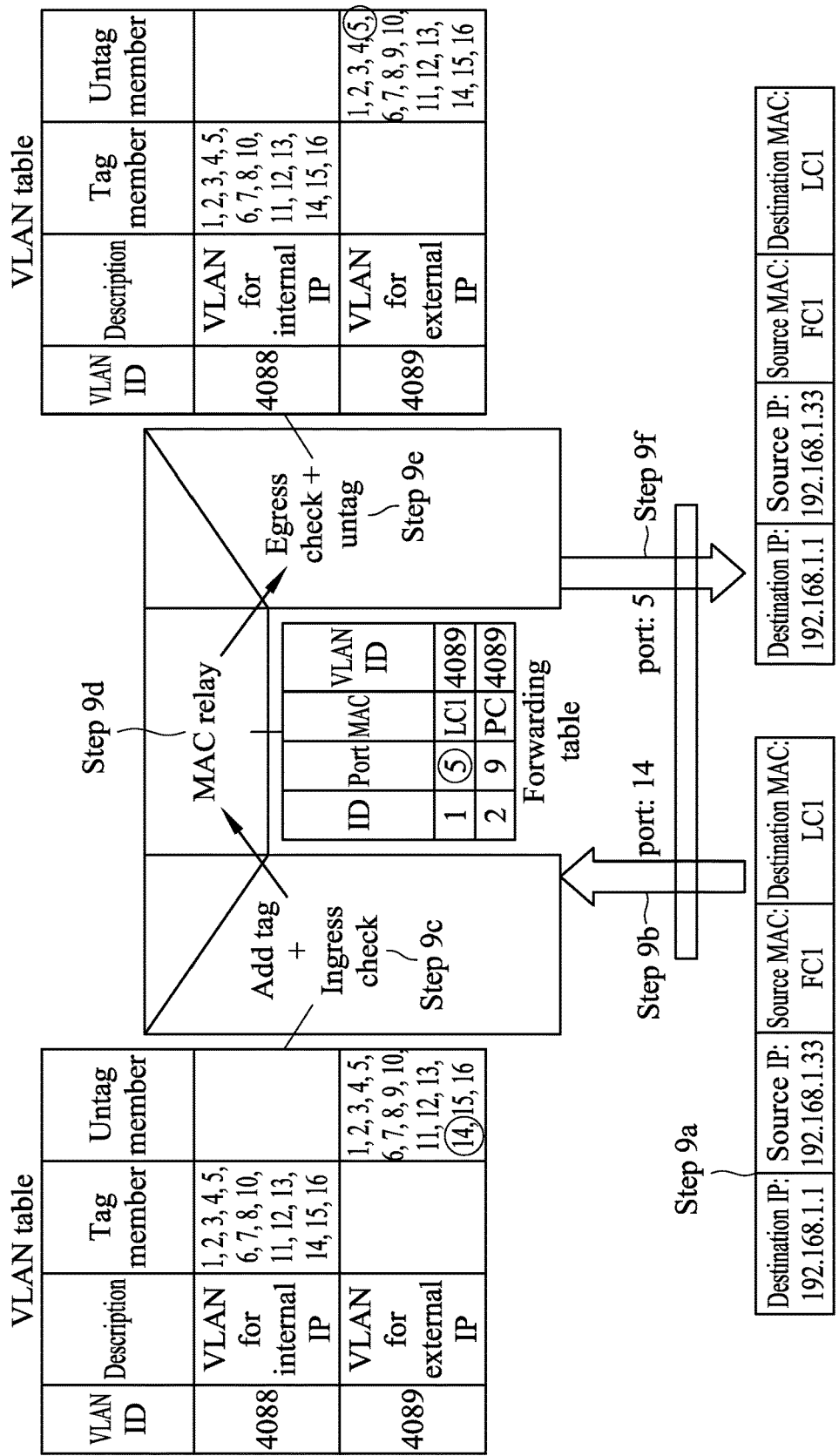
FIG. 9 is a schematic diagram illustrating the management of packet forwarding for packets originating from external IP addresses according to an embodiment of the application.

FIG. 9 is a schematic diagram illustrating the management of packet forwarding for packets originating from external IP addresses according to an embodiment of the application.

In step 9a, the controller 310 of a fabric card determines to use its external IP address to pine the controller 410 of a line card, and accordingly, it generates a layer-3 (i.e., the network layer of the OSI reference model) packet (i.e., the packet originated from an external IP address as described in FIG. 8).

Specifically, the header of the packet includes the destination IP address, the source IP address, the source MAC address, and the destination MAC address of the packet. As shown in FIG. 9, the destination IP address is "192.168.1.1", the source IP address is "192.168.1.33", the source MAC address is denoted as "FC1", and the destination MAC address is denoted as "LC1".

In step 9b, the controller 310 of the fabric card sends the packet to port 14 of the switch device 330. That is, port 14 is the ingress port of the packet.

In step 9c, the switch device 330 includes a VLAN tag (i.e., VLAN ID=4089 in this embodiment) in the packet originating from an external IP address (i.e., tags the packet with a VLAN tag), and then performs an ingress check on the packet. Specifically, the ingress check is to look up the VLAN table using the VLAN tag (i.e., VLAN ID=4089) and the ingress port number (i.e., port 14), and determines whether the ingress port is a valid port (member port) of the VLAN with VLAN ID=4089. In this embodiment, all ports are configured as valid ports of the VLAN with VLAN ID=4089 in the VLAN table, and thus, the ingress port (i.e., port 14) is determined to be a valid port and the packet passes the ingress check.

In step 9d, the packet goes through a process of MAC relay in the switch device 330. Specifically, the MAC relay includes the switch device 330 looking up the forwarding table using the destination MAC address (i.e., LC1) and the VLAN tag (i.e., VLAN ID=4089) of the packet to determine the egress port of the packet. In this embodiment, the egress port is port 5.

In step 9e, the switch device 330 performs an egress check on the packet. Specifically, the egress check is to look up the VLAN table using the VLAN tag (i.e., VLAN ID=4089) and the egress port number (i.e., port 5), and determines whether the egress port is a valid port (member port) of the VLAN with VLAN ID=4089. In this embodiment, the egress port (i.e., port 5) is determined to be a valid port and the packet passes the egress check. In response to the packet passing the egress check, the switch device 330 further removes the VLAN tag from the packet (which may be referred to as un-tagging the packet).

Finally, in step 9f, the switch device 330 forwards the packet via port 5.

Figure 10:
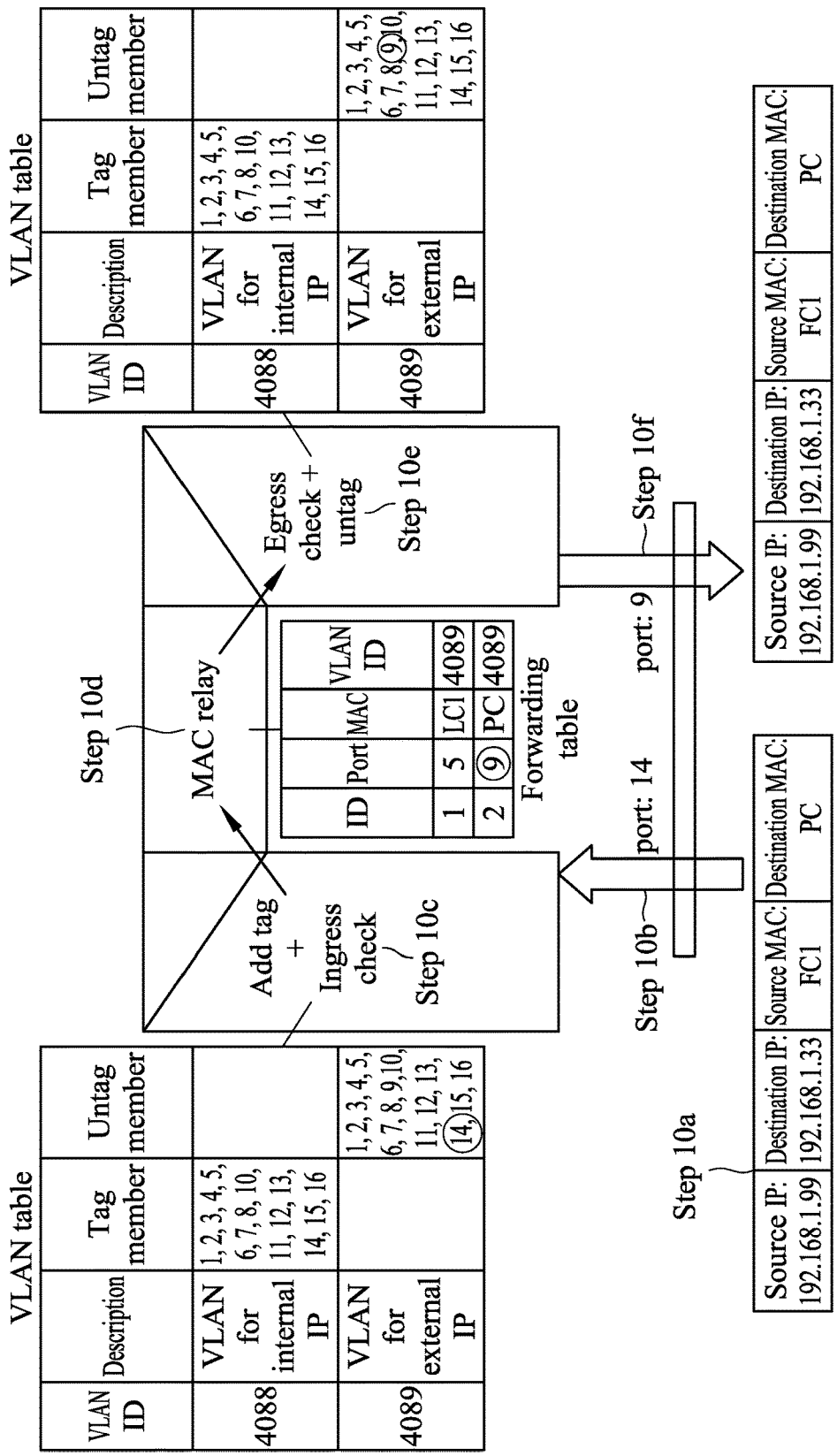
FIG. 10 is a schematic diagram illustrating the management of packet forwarding for packets originating from external IP addresses according to another embodiment of the application.

FIG. 10 is a schematic diagram illustrating the management of packet forwarding for packets originating from external IP addresses according to another embodiment of the application.

In step 10a, the controller 310 of a fabric card determines to use its external IP address to pine a network terminal device other than the chassis switches 20 and 30, and accordingly, it generates a layer-3 (i.e., the network layer of the OSI reference model) packet (i.e., the packet originated from an external IP address as described in FIG. 8).

Specifically, the header of the packet includes the destination IP address, the source IP address, the source MAC address, and the destination MAC address of the packet. As shown in FIG. 10, the destination IP address is "192.168.1.99", the source IP address is "192.168.1.33", the source MAC address is denoted as "FC1", and the destination MAC address is denoted as "PC".

In step 10b, the controller 310 of the fabric card sends the packet to port 14 of the switch device 330. That is, port 14 is the ingress port of the packet.

In step 10c, the switch device 330 includes a VLAN tag (i.e., VLAN ID=4089 in this embodiment) in the packet originating from an external IP address (i.e., tags the packet with a VLAN tag), and then performs an ingress check on the packet. Specifically, the ingress check is to look up the VLAN table using the VLAN tag (i.e., VLAN ID=4089) and the ingress port number (i.e., port 14), and determines whether the ingress port is a valid port (member port) of the VLAN with VLAN ID=4089. In this embodiment, all ports are configured as valid ports of the VLAN with VLAN ID=4089 in the VLAN table, and thus, the ingress port (i.e., port 14) is determined to be a valid port and the packet passes the ingress check.

In step 10*d,* the packet goes through a process of MAC relay in the switch device 330. Specifically, the MAC relay includes the switch device 330 looking up the forwarding table using the destination MAC address (i.e., PC) and the VLAN tag (i.e., VLAN ID=4089) of the packet to determine the egress port of the packet. In this embodiment, the egress port is port 9.

In step 10*e,* the switch device 330 performs an egress check on the packet. Specifically, the egress check is to look up the VLAN table using the VLAN tag (i.e., VLAN ID=4089) and the egress port number (i.e., port 9), and determines whether the egress port is a valid port (member port) of the VLAN with VLAN ID=4089. In this embodiment, since all ports are configured as valid ports of the VLAN with VLAN ID=4089, the packet passes the egress check. In response to the packet passing the egress check, the switch device 330 further removes the VLAN tag from the packet (which may be referred to as un-tagging the packet).

Finally, in step 10*f,* the switch device 330 forwards the packet via port 9.

In view of the forgoing embodiments of FIGS. 5 to 10, it will be appreciated that the method for management of packet forwarding in the present application establishes VLANs to prevent packets originating from internal IP addresses from being forwarded to the outside of the chassis switch, while allowing packets originating from external IP addresses to be forwarded. Advantageously, the IP conflicts that may occur due to packets originating from internal IP addresses being forwarded to the outside of chassis switches may be efficiently avoided.

While the application has been described by way of example and in terms of preferred embodiment, it should be understood that the application is not limited thereto. Those who are skilled in this technology can still make various alterations and modifications without departing from the scope and spirit of this application. For example, although the embodiments of FIGS. 6~7 and 9~10 are described using a fabric card as the subject, the method for management of packet forwarding may also be applied to a line card, as long as the line card has an external port in its system architecture. Therefore, the scope of the present application shall be defined and protected by the following claims and their equivalents.

Note that use of ordinal terms such as "first", "second", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A chassis switch, comprising:
    a network interface card, comprising an external port for communications towards outside of the chassis switch, and configured to process a first packet originating from an internal Internet Protocol (IP) address, and a second packet originating from an external IP address;
    wherein the processing of the first packet comprises: including a first Virtual Local Area Network (VLAN) tag in the first packet, determining a first egress port for the first packet according to the first VLAN tag and a first Media Access Control (MAC) address included in the first packet, and dropping the first packet when the first egress port is the external port;
    wherein the processing of the second packet comprises: including a second VLAN tag in the second packet, determining a second egress port for the second packet according to the second VLAN tag and a second MAC address included in the second packet, and removing the second VLAN tag from the second packet and forwarding the second packet via the second egress port.

2. The chassis switch of claim 1, wherein the processing of the first packet further comprises: forwarding the first packet via the first egress port when the first egress port is not the external port.

3. The chassis switch of claim 1, wherein the network interface card further comprises:
    a controller, configured to generate the first packet and the second packet; and
    a switch device, configured to perform the processing of the first packet and the second packet.

4. The chassis switch of claim 3, wherein the switch device is further configured to maintain a forwarding table storing mapping information between the first egress port, the first VLAN tag, and the first MAC address, to drop the first packet when the first egress port is the external port, and to forward the first packet when the first egress port is not the external port.

5. A method for management of packet forwarding, executed by a network interface card of a chassis switch, the method comprising:
    processing a first packet originating from an internal IP address, wherein the processing of the first packet comprises: including a first VLAN tag in the first packet, determining a first egress port for the first packet according to the first VLAN tag and a first MAC address included in the first packet, and dropping the first packet when the first egress port is the external port; and
    processing a second packet originating from an external IP address, wherein the processing of the second packet comprises: including a second VLAN tag in the second packet, determining a second egress port for the second packet according to the second VLAN tag and a second MAC address included in the second packet, and removing the second VLAN tag from the second packet and forwarding the second packet via the second egress port.

6. The method of claim 5, wherein the processing of the first packet further comprises: forwarding the first packet via the first egress port when the first egress port is not the external port.

7. The method of claim 5, further comprising:
    generating, by a controller of the network interface card, the first packet and the second packet; and
    performing, by a switch device of the network interface card, the processing of the first packet and the second packet.

8. The method of claim 5, further comprising:
    maintaining, by a switch device, a forwarding table storing mapping information between the first egress port, the first VLAN tag, and the first MAC address;
    dropping, by the switch device, the first packet when the first egress port is the external port; and
    forwarding, by the switch device, the first packet when the first egress port is not the external port.

9. A network interface card, installed in a chassis switch, comprising:
- an external port, configured for communications towards outside of the chassis switch;
- a controller, configured to generate a first packet originating from an internal IP address, and a second packet originating from an external IP address; and
- a switch device, configured to include a first VLAN tag in the first packet, determine a first egress port for the first packet according to the first VLAN tag and a first MAC address included in the first packet, drop the first packet when the first egress port is the external port, include a second VLAN tag in the second packet, determine a second egress port for the second packet according to the second VLAN tag and a second MAC address included in the second packet, and remove the second VLAN tag from the second packet and forward the second packet via the second egress port.

10. The network interface card of claim 9, wherein the switch device is further configured to forward the first packet via the first egress port when the first egress port is not the external port.

11. The network interface card of claim 10, wherein the switch device is further configured to maintain a forwarding table storing mapping information between the first egress port, the first VLAN tag, and the first MAC address.

* * * * *